(12) United States Patent
Matsumoto et al.

(10) Patent No.: US 7,098,651 B2
(45) Date of Patent: Aug. 29, 2006

(54) ROTATION DETECTION SENSOR

(75) Inventors: Yoshifumi Matsumoto, Hisai (JP); Masashi Sugimoto, Hisai (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 45 days.

(21) Appl. No.: 10/469,405

(22) PCT Filed: Feb. 17, 2002

(86) PCT No.: PCT/JP02/01811

§ 371 (c)(1),
(2), (4) Date: Aug. 28, 2003

(87) PCT Pub. No.: WO02/071077

PCT Pub. Date: Dec. 9, 2002

(65) Prior Publication Data

US 2004/0066197 A1    Apr. 8, 2004

(30) Foreign Application Priority Data

Mar. 1, 2001   (JP)   ............................. 2001-056861

(51) Int. Cl.
*G01P 3/48* (2006.01)
*G01B 7/30* (2006.01)
(52) U.S. Cl. .................. 324/173; 324/207.25
(58) Field of Classification Search ........ 324/160–180, 324/173, 207.25
See application file for complete search history.

(56) References Cited

U.S. PATENT DOCUMENTS

| | | | |
|---|---|---|---|
| 3,597,663 A | 8/1971 | Markarian | |
| 4,629,755 A * | 12/1986 | Kanaoka et al. | 524/415 |
| 5,010,119 A | 4/1991 | McElrath, Jr. et al. | |
| 5,254,807 A | 10/1993 | Pfander et al. | |
| 6,064,200 A * | 5/2000 | Saito et al. | 324/207.25 |
| 6,291,990 B1 * | 9/2001 | Nakane et al. | 324/207.25 |

FOREIGN PATENT DOCUMENTS

JP            63-140912        6/1988

(Continued)

OTHER PUBLICATIONS

Notice of Ground of Rejection by the Japanese Patent Office and translation thereof.

(Continued)

*Primary Examiner*—Edward Lefkowitz
*Assistant Examiner*—David M Schindler
(74) *Attorney, Agent, or Firm*—Smith, Gambrell & Russell, LLP

(57) ABSTRACT

A rotation detection sensor, which is a wheel-speed sensor, has a detection unit placed in a metal capped cylindrical casing and a holder fit in an opening of the casing. A flange is provided along the entire edge of the opening of the casing. Between the flange and the holder, a viscoelastic liquid gasket is entirely applied. The edge of the opening of the casing and the exposed part of the holder are covered with a resin portion. Thus, the viscoelastic liquid gasket smoothly enters the gap between the casing and the holder to ensure the gap is closed. Moreover, since the viscoelastic liquid gasket is quickly cured owing to its solvent which is speedily volatilized, the gasket exhibits a good workability. Then, after the solvent is volatilized, a rubber-based elastic sealing material is produced. The sealing material thus withstands any temperature change without problem, it never occurs that the sealing material melts to leak out, and the sealing between the casing and the holder can be ensured.

6 Claims, 4 Drawing Sheets

FOREIGN PATENT DOCUMENTS

| | | | |
|---|---|---|---|
| JP | 4-3357 | | 1/1992 |
| JP | 4-8967 | | 1/1992 |
| JP | 5-14735 | | 2/1993 |
| JP | 5-302932 | | 11/1993 |
| JP | 7-12831 | | 1/1995 |
| JP | 07012831 A | * | 1/1995 |
| JP | 7-140156 | | 6/1995 |
| JP | 7-198736 | | 8/1995 |
| JP | 09241713 A | * | 9/1997 |
| JP | 10-032951 | | 2/1998 |
| JP | 10-260194 | | 9/1998 |
| JP | 2000-019004 | | 1/2000 |
| JP | 2000-041363 | | 2/2000 |
| JP | 2000-091764 | | 3/2000 |
| JP | 2000-180460 | | 6/2000 |
| JP | 2000-226567 | | 8/2000 |

OTHER PUBLICATIONS

Supplementary European Search Report (Application No. EP 02 70 1605 dated Mar. 31, 2006).

* cited by examiner

ROTATION DETECTION SENSOR

TECHNICAL FIELD

The present invention relates to a rotation detection sensor and, in particular, to a rotation detection sensor such as a wheel-speed sensor for the motor vehicle and an engine rpm sensor for detecting rotation.

BACKGROUND ART

A wheel-speed sensor, for example, is used for detecting the rotational speed of the wheels of a motor vehicle. A conventional wheel-speed sensor is then described. As shown in FIG. 5, a wheel-speed sensor 110 has a detection unit 107 inserted from an opening 101a of a capped tubular casing 101 thereinto and attached to the cap. A resin holder 102 is fit in opening 101a.

A hot melt 103 is applied entirely between the edge of opening 101a and holder 102 to close the space therebetween. Then, opening 101a and an exposed part of holder 102 are covered with a resin portion 104.

Detection unit 107 of wheel-speed sensor 110 is disclosed, for example, in Japanese Patent Laying-Open Nos. 5-302932 and 7-198736 that is formed of a magnetic detection IC chip and its control electronic components (circuit).

Japanese Patent Laying-Open No. 10-260194 discloses a component employed as a detection unit that has a pole piece provided inside a bobbin having a coil wounded and held thereon and a magnet behind the pole piece.

As shown in FIG. 5, wheel-speed sensor 110 is placed to face a rotating object to be detected, namely object B. A change in a magnetic field caused by rotation of object B is sensed by detection unit 107 and converted into an electric signal. Detection unit 107 is connected to an output line 106 via a relay terminal 105.

To object B, a ferromagnetic pulsar ring with gear-like tooth around its perimeter is applied. Moreover, a magnetic pulsar ring is applied that is magnetized to exhibit south poles and north poles located alternately and successively around its perimeter in the circumferential direction.

Suppose that the above-described wheel-speed sensor is used for such a large-sized vehicle as a large motortruck, for example. As the distance traveled by the large-sized vehicle is longer than that of the normal-sized car, the temperature change of the chassis of the large-sized vehicle is greater. For this reason, it is required that wheel-speed sensor 110 ensures its detection accuracy for a temperature change in the range, for example, from −40° C. to 160° C.

At a temperature of approximately 160° C., however, hot melt 103 starts to be melted (softening temperature of hot metal: 150° C. –160° C.). In particular, molten hot melt 103 entering detection unit 107 causes deterioration of internal electric wires and the like. In addition, molten hot melt 103 deteriorates sealing of wheel-speed sensor 110 and consequently impairs detection accuracy.

DISCLOSURE OF THE INVENTION

The present invention has been made to solve the problems above. It is an object of the present invention to provide a rotation detection sensor ensuring a sufficient sealing for any temperature change.

A rotation detection sensor according to the present invention is a rotation detection sensor sensing a change in a magnetic field caused by rotation of an object to be detected, so as to detect the rotation of the object, including a capped tubular casing, a detection unit, a holder, a synthetic-rubber-based solvent-type sealing material and a resin portion. The detection unit is placed in the capped tubular casing to detect the magnetic field. The holder has an outer peripheral portion fit in an opening edge of the capped tubular casing and is placed to have a projecting portion projecting from the opening edge. The synthetic-rubber-based solvent-type sealing material is formed entirely along an outer peripheral surface, at least at the opening edge, of the capped tubular casing. The resin portion entirely covers the projecting portion of the holder, the opening edge of the capped tubular casing and the synthetic-rubber-based solvent-type sealing material, and continuously extends from the projecting portion of the holder to the opening edge of the capped tubular casing.

With this structure, even if water or the like enters from a gap between the resin portion and the capped tubular casing, the synthetic-rubber-based solvent-type sealing material formed along the outer peripheral surface of the capped tubular casing near the opening edge of the capped tubular casing prevents water or the like from entering further toward a gap between the capped tubular casing and the holder. In addition, the synthetic-rubber-based solvent-type sealing material withstands any temperature change without problem, it never occurs that the synthetic-rubber-based solvent-type sealing material melts to leak out, and the sealing between the capped tubular casing and the holder is ensured.

Preferably, the rotation detection sensor further includes an outward flange provided to the opening edge of the capped tubular casing, and the synthetic-rubber-based solvent-type sealing material is formed entirely along the flange and the projecting portion of the holder to extend from the projecting portion of the holder to the flange.

In this case, the flange receives the synthetic-rubber-based solvent-type sealing material. Since the synthetic-rubber-based solvent-type sealing material is of a solvent type and in a liquid state, the synthetic-rubber-based sealing material smoothly enters the gap between the capped tubular casing and the holder to ensure the closedness between the capped tubular casing and the holder.

Preferably, the rotation detection sensor further includes a groove provided entirely along the projecting portion of the holder that abuts on the opening edge of the capped tubular casing, and the synthetic-rubber-based solvent-type sealing material fills the groove entirely along the groove and the projecting portion of the holder to extend from the projecting portion of the holder to the groove.

In this case, the synthetic-rubber-based solvent-type sealing material fills the groove and this synthetic-rubber-based solvent-type sealing material is of solvent type and in a liquid state. Accordingly, the synthetic-rubber-based solvent-type sealing material smoothly enters the gap between the capped tubular casing and the holder to ensure the closedness of the capped tubular casing and the holder.

Still preferably, the synthetic-rubber-based solvent-type sealing material specifically includes a viscoelastic liquid gasket.

Preferably, the synthetic-rubber-based solvent-type sealing material in a state of being covered with the resin portion has its solvent volatilized.

BEST MODES FOR CARRYING OUT THE INVENTION

A rotation detection sensor according to an embodiment of the present invention is hereinafter described. The rotation detection sensor has a detection unit which detects a change in a magnetic field caused by rotation of an object to be detected, and the detected change is converted into an electric signal. The detection unit is attached to a holder. The detection unit is inserted from an opening of a capped tubular casing thereinto and attached to the cap. The holder is fit in the opening.

A space between the edge of the opening and the holder is entirely closed up by a synthetic-rubber-based solvent-type sealing material. Moreover, the edge of the opening and the holder are covered with a resin portion.

As the synthetic-rubber-based solvent-type sealing material, a viscoelastic liquid gasket can be employed, for example, a viscoelastic liquid gasket manufactured by Sumitomo 3M Ltd. or a viscoelastic liquid gasket manufactured by Cemedine Co., Ltd.

The viscoelastic liquid gasket has a sufficient adhesiveness even at a temperature of, for example, 160° C. and has a high vibration resistance and a high dust resistance. A reason for this is considered to be the fact that the gasket is rubber-based and therefore has a high viscosity.

The closedness between the opening of the casing and the holder depends on whether the sealing material is surely placed therebetween by application, filling or the like. Therefore, an outward flange is preferably provided to the opening of the casing to receive the sealing material by the flange and accordingly ensure the closedness.

Further, it is preferable, for ensuring the closedness, to form a groove entirely along an outer peripheral surface of the holder that abuts on the opening of the casing and fill the groove with the sealing material. Moreover, both of the flange and groove may be used.

Preferably, the resin portion is formed, after the synthetic-rubber-based solvent-type sealing material is applied and left under a high-temperature condition to sufficiently volatilize the solvent component. A reason for this is that, if the solvent is not sufficiently volatilized and a part of the solvent is left in the sealing material, the non-volatilized part of the sealing material is volatilized in the process of forming the resin portion and issues forth into the resin portion to deteriorate the sealing, impair characteristics of internal components and impair the appearance.

Figure 1:
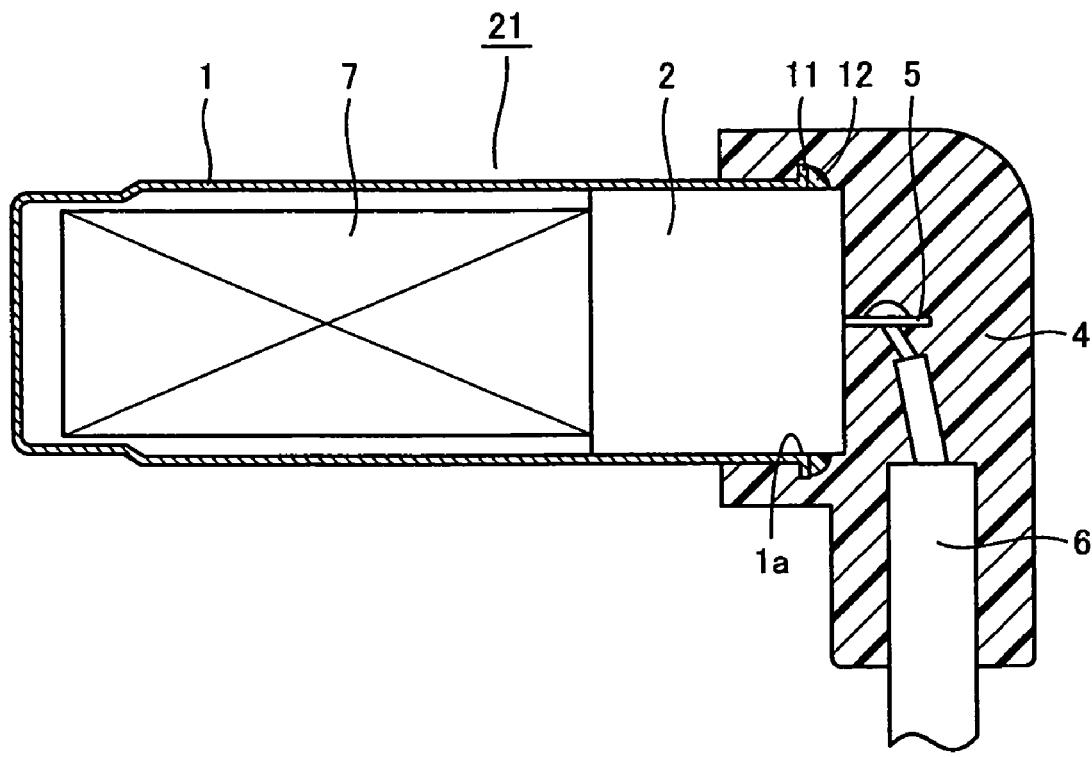
FIG. 1 is a cross-sectional view of a rotation detection sensor according to an embodiment of the present invention.

A structure of a wheel-speed sensor as one example of the rotation detection sensor is now specifically described. As shown in FIG. 1, a wheel-speed sensor 21 has a detection unit 7 placed within a metal capped cylindrical casing 1. A holder 2 is fit in an opening la of casing 1.

An outward flange 11 is provided entirely along the edge of opening 1a of casing 1. Between flange 1 and holder 2, a viscoelastic liquid gasket (sealing material) 12 manufactured by Sumitomo 3M Ltd. is applied to close up the space between flange 11 and holder 2. This viscoelastic liquid gasket 12 contains a rubber portion with 76 wt. % of a solvent volatilized and accordingly exhibits a sufficient elasticity.

A relay terminal 5 extending from detection unit 7 is taken from holder 2. A cord (output line) 6 is connected to relay terminal 5. With cord 6 connected, the edge of opening 1a of casing 1 and an exposed part of holder 2 are covered with resin portion 4.

Wheel-speed sensor 21 described above has outward flange 11 provided to opening 1a of casing 2 and this flange 11 receives viscoelastic liquid gasket 12. Since viscoelastic liquid gasket 12 is of solvent type and is in a liquid state, viscoelastic liquid gasket 12 smoothly enters the gap between casing 1 and holder 2 to ensure the closedness between casing 1 and holder 2.

Further, viscoelastic liquid gasket 12 is quickly cured as its solvent is volatilized speedily, and thus has a good workability. Moreover, after the solvent is volatilized, the rubber-based elastic sealing material is produced. Thus, the sealing material withstands any temperature change without problem, it never occurs that the sealing material melts to leak out, and accordingly, the sealing between casing 1 and holder 2 can be ensured.

Figure 2:
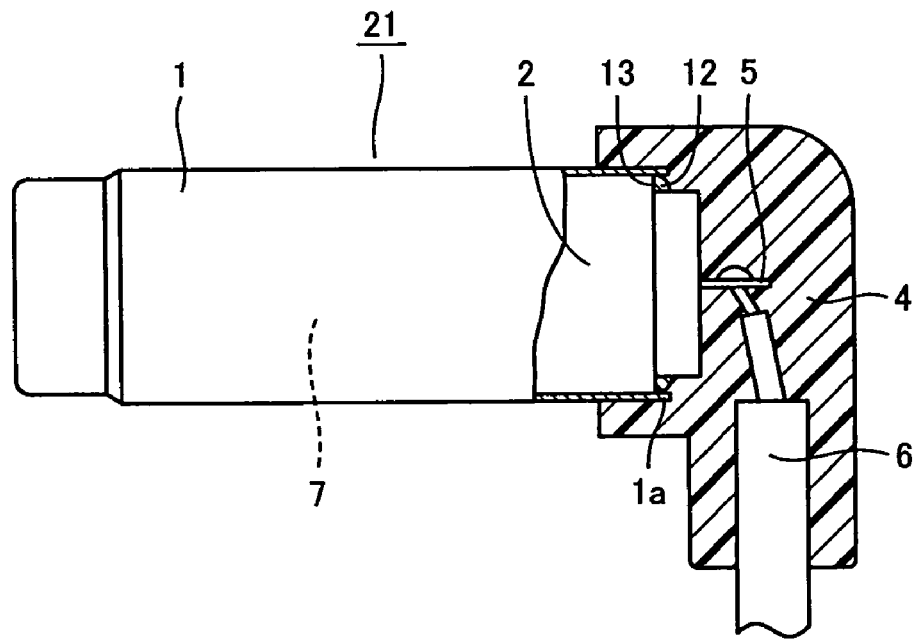
FIG. 2 is a cross-sectional view of a rotation detection sensor according to a modification of the embodiment.

A wheel-speed sensor 21 according to a modification is described. As shown in FIG. 2, wheel-speed sensor 21 according to the modification has, instead of flange 11 provided to casing 1, a groove 13 formed entirely along an outer peripheral part of holder 2 that abuts on opening 1a of casing 1. Groove 13 is filled with viscoelastic liquid gasket 12.

This wheel-speed sensor 21 thus has groove 13 provided entirely along the outer peripheral part of holder 2 that abuts on opening 1a of casing 1, and groove 13 receives viscoelastic liquid gasket 12.

As mentioned above, since viscoelastic liquid gasket 12 is of solvent type and in a liquid state, viscoelastic liquid gasket 12 smoothly enters the gap between casing 1 and holder 2 to ensure the closedness between casing 1 and holder 2.

Moreover, viscoelastic liquid gasket 12 has its solvent volatilized speedily and then the rubber-based elastic sealing material is produced. Thus, the sealing material withstands any temperature change without problem, it never occurs that the sealing material melts to leak out, and accordingly, the sealing between casing 1 and holder 2 can be ensured.

The above two types of wheel-speed sensors 21 are exemplarily described as using viscoelastic liquid gasket (sealing material) 12 which directly seals casing 1 and holder 2. Alternatively, viscoelastic liquid gasket 12 may be applied to the outer peripheral surface of casing 1 to form a sealing layer thereby indirectly close casing 1 and holder 2.

Description is then given below of a wheel-speed sensor according to another modification having casing 1 and holder 2 indirectly closed and of a wheel-speed sensor according to still another modification.

Figure 3:
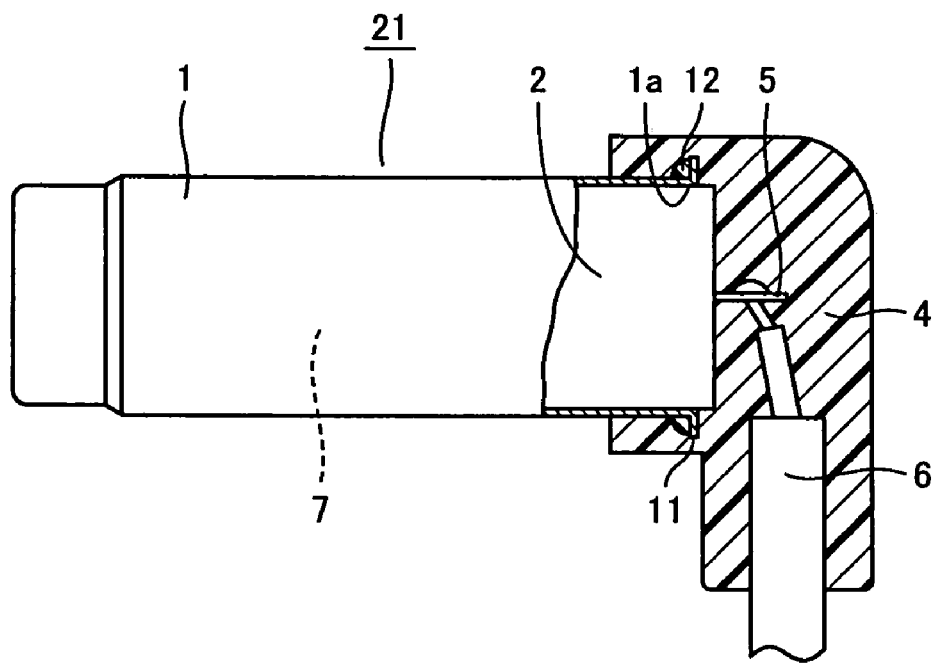
FIG. 3 is a cross-sectional view of a rotation detection sensor according to another modification of the embodiment.

As shown in FIG. 3, wheel-speed sensor 21 of that another modification has flange 11 provided to casing 1 and viscoelastic liquid gasket (sealing material) 12 is applied to an outer peripheral surface of casing 1 where flange 11 is placed.

Figure 4:
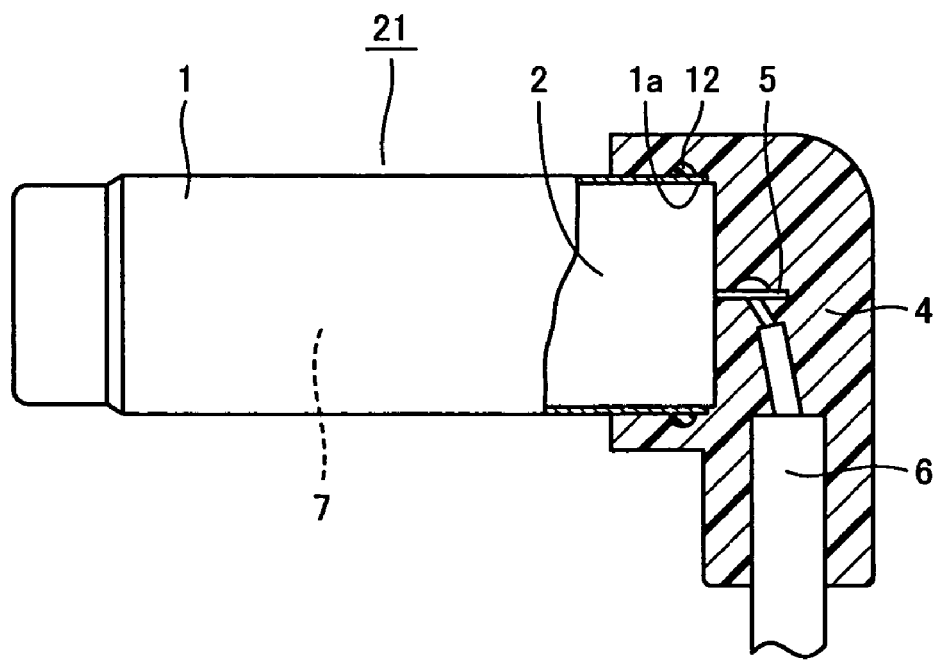
FIG. 4 is a cross-sectional view of still another modification of the embodiment.
Figure 5:
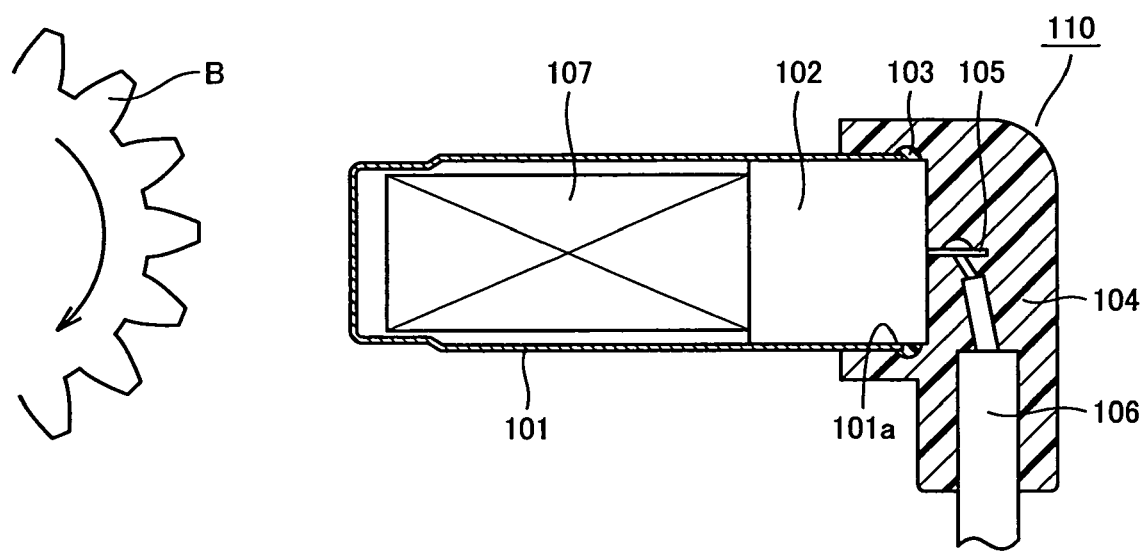
FIG. 5 is a cross-sectional view of a conventional rotation detection sensor.

As shown in FIG. 4, wheel-speed sensor 21 of still another modification has viscoelastic liquid gasket (sealing material) 12 applied to an outer peripheral surface of casing 1 near opening 1a of casing 1.

Regarding the above-described wheel-speed sensor 21 of another modification and wheel-speed sensor 21 of still another modification, even if water for example enters from a gap between resin 4 and casing 1, viscoelastic liquid gasket (sealing material) 12 formed by application on the outer peripheral surface of casing 1 near opening 1a of casing 1 prevents the water for example from further entering toward a gap between casing 1 and holder 2.

In addition, as discussed above, the sealing material-withstands any temperature change without problem, it never occurs that the sealing material melts to leak out, and accordingly, sealing between casing 1 and holder 2 is ensured.

For each of wheel-speed sensors 21 shown respectively in FIGS. 1–4, a thermal shock test was conducted. In one cycle of the thermal shock test, wheel-speed sensor 21 was held at. –40° C. for 30 minutes and then wheel-speed sensor 21 was held at 160° C. for 30 minutes. This cycle was repeated 200 times. The result of the thermal shock test indicated that none of wheel-speed sensors 21 exhibited deteriorated detection accuracy.

Moreover, a water-soak test was conducted by soaking each wheel-speed sensor 21 in water, freezing it at a temperature of –30° C. and thereafter increasing the temperature to 100° C. to vaporize water. Further, a high-temperature limit test was conducted (no problem occurred under a condition of 180° C. /200° C. ×1 hour). These tests indicated that no problem occurred in any of wheel-speed sensors 21.

Reasons why such results are obtained are considered to be that: the viscoelastic liquid gasket 12 provides a stable bonding strength at a high temperature between the viscoelastic liquid gasket (sealing material) and metal as well as a stable bonding strength at high and low temperatures between the viscoelastic liquid gasket and resin and, even if the air in casing 1 expands or contracts due to a temperature change, the viscoelasticity of the gasket can absorb the expansion to prevent deterioration of the sealing between the casing and the holder.

Figure 6:
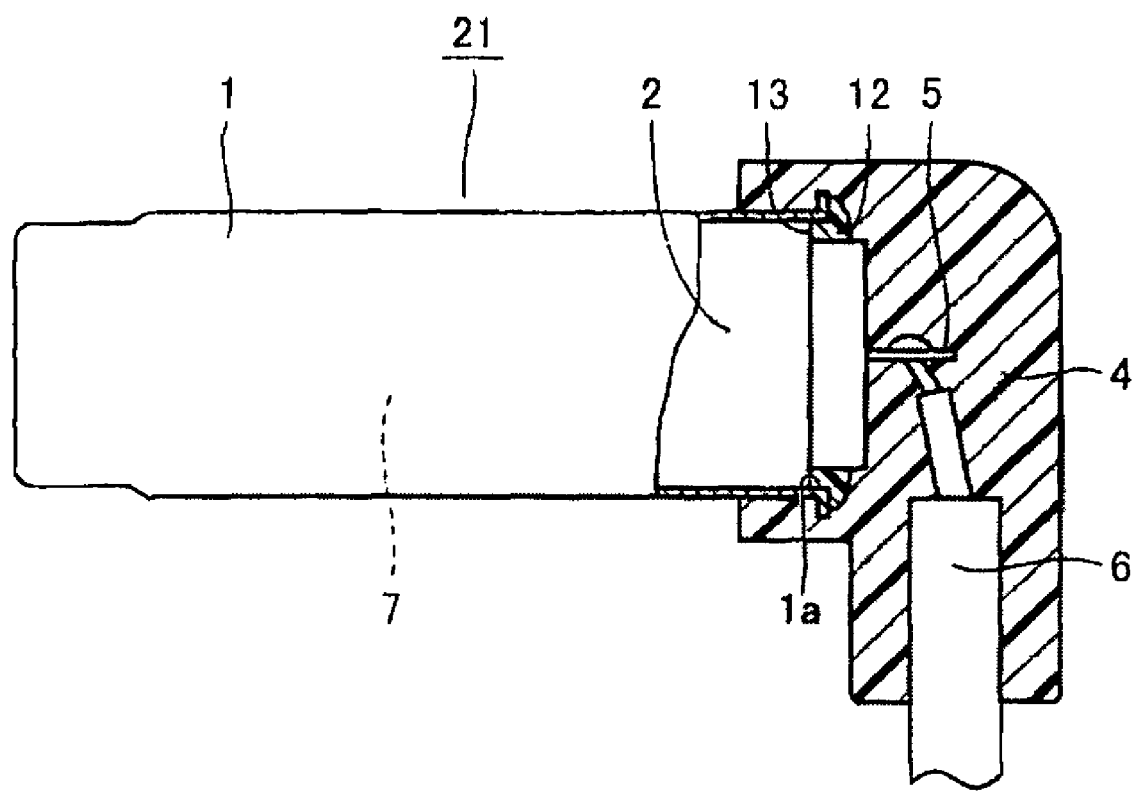
FIG. 6 is a cross-sectional view of a rotation detection sensor according to the present inventions.

FIG. 6 is a cross section of an embodiment of the inventions. It shows a flange with its synthetic-rubber based solvent-type sealing material.

It is noted that, although the embodiments above have been described regarding the wheel-speed sensor as a rotation detection sensor, the embodiments are not limited to the wheel-speed sensor and are applicable to other rotation detection sensors having a detection unit detecting a magnetic field generated by rotation of an object to be detected.

The foregoing description of the embodiments should be considered as being presented by way of example in all respects and not being intended to be limiting. The scope of the present invention is defined not by the above description but by claims and is intended to encompass all modifications within the meaning and range equivalent to the claims.

INDUSTRIAL APPLICABILITY

The present invention serving as a rotation detection sensor applied, for example, to a wheel-speed sensor of the motor vehicle and an engine rpm sensor, is effective for a structure improving the sealing between the casing and the holder.

The invention claimed is:

1. A rotation detection sensor sensing a change in a magnetic field caused by rotation of an object to be detected, so as to detect the rotation of the object, comprising:

a capped tubular casing;

a detection unit placed in said capped tubular casing to detect the magnetic field;

a holder having an outer peripheral portion fit in an opening edge of said capped tubular casing and being placed to have a projecting portion projecting from said opening edge;

a synthetic-rubber-based solvent-type sealing material formed entirely along an outer peripheral surface, at least at said opening edge, of said capped tubular casing;

a resin portion entirely covering the projecting portion of said holder, said opening edge of said capped tubular casing and said synthetic-rubber-based solvent-type sealing material, and continuously extending from the projecting portion of said holder to said opening edge of said capped tubular casing;

an outward flange provided to said opening edge of said capped tubular casing; and a groove provided entirely along the projecting portion of said holder that abuts on said opening edge of said capped tubular casing, wherein said synthetic-rubber-based solvent-type sealing material is formed entirely along said flange and the projecting portion of said holder to extend from the projecting portion of said holder to said flange, said synthetic-rubber-based solvent-type sealing material fills said groove entirely along said groove and the projecting portion of said holder to extend from the projecting portion of said holder to said groove, and the groove is formed between an inner peripheral portion of the opening edge of the capped tubular casing and an outer peripheral portion of the projecting portion of the holder.

2. The rotation detection sensor according to claim 1, wherein
said synthetic-rubber-based solvent-type sealing material includes a viscoelastic liquid gasket.

3. The rotation detection sensor according to claim 1, wherein
said synthetic-rubber-based solvent-type sealing material in a state of being covered with said resin portion has its solvent volatilized.

4. A rotation detection sensor sensing a change in a magnetic field caused by rotation of an object to be detected, so as to detect the rotation of the object, comprising:

a capped tubular casing;

a detection unit placed in said capped tubular casing to detect the magnetic field;

a holder having an outer peripheral portion fit in an opening edge of said capped tubular casing and being placed to have a projecting portion projecting from said opening edge;

a synthetic-rubber-based solvent-type sealing material formed entirely along an outer peripheral surface, at least at said opening edge, of said capped tubular casing;

a resin portion entirely covering the projecting portion of said holder, said opening edge of said capped tubular casing and said synthetic-rubber-based solvent-type sealing material, and continuously extending from the projecting portion of said holder to said opening edge of said capped tubular casing; and a groove provided entirely along the projecting portion of said holder that abuts on said opening edge of said capped tubular casing, wherein said synthetic-rubber-based solvent-type sealing material fills said groove entirely along said groove and the projecting portion of said holder to extend from the projecting portion of said holder to said groove, and said groove is formed between an inner peripheral portion of the opening edge of the capped tubular casing and an outer peripheral portion of the projecting portion of the holder.

5. The rotation detection sensor according to claim 4, wherein said synthetic-rubber-based solvent-type sealing material includes a viscoelastic liquid gasket.

6. The rotation detection sensor according to claim 4, wherein said synthetic-rubber-based solvent-type sealing material in a state of being covered with said resin portion has its solvent volatilized.

* * * * *

UNITED STATES PATENT AND TRADEMARK OFFICE
CERTIFICATE OF CORRECTION

| | |
|---|---|
| PATENT NO. | : 7,098,651 B2 |
| APPLICATION NO. | : 10/469405 |
| DATED | : August 29, 2006 |
| INVENTOR(S) | : Yoshifumi Matsumoto et al. |

Page 1 of 1

It is certified that error appears in the above-identified patent and that said Letters Patent is hereby corrected as shown below:

On the cover sheet, at (22) PCT Filed, change "Feb. 17, 2002" to --Feb. 27, 2002--; and at (86) § 371 (c) (1) (2), (4) Date, change "Aug. 28, 2003" to --Aug. 29, 2003--.

Signed and Sealed this

Thirteenth Day of March, 2007

JON W. DUDAS
*Director of the United States Patent and Trademark Office*